March 17, 1964     J. T. MULLER     3,125,121
THROTTLING VALVE
Filed Feb. 17, 1961

INVENTOR
John T. Muller
BY
ATTORNEYS

United States Patent Office 3,125,121
Patented Mar. 17, 1964

3,125,121
THROTTLING VALVE
John T. Muller, Nutley, N.J., assignor to Leslie Co., Lyndhurst, N.J., a corporation of New Jersey
Filed Feb. 17, 1961, Ser. No. 90,088
1 Claim. (Cl. 137—614.11)

This invention relates to valves for controlling the flow of fluids and, more particularly, to a throttling valve adapted for use in controlling the flow of fluid under high pressure.

In the copending application Serial No. 742,815, filed June 18, 1958, now Patent No. 2,988,105, there is described a throttling valve characterized by a floating sleeve-like member so positioned as to perform the throttling action of the valve. The valve comprises a body having an inlet side and an outlet side, a valve seat between the inlet and outlet sides, a valve member cooperating with the valve seat, and a valve stem operatively associated with the valve member. The sleeve-like member surrounds the valve stem and is axially locked to the stem so as to be movable axially therewith. A cylinder in the valve body closely surrounds the sleeve-like member and has a port on only one side thereof facing the outlet side of the valve body. The sleeve closes the port when the valve member is within a predetermined distance of its seat and exposes the port as the valve member moves beyond this predetermined distance from its seat. The clearance between the valve stem and the inner surface or bore of the surrounding sleeve is greater than the clearance between the outer surface of the sleeve and the inner surface of the cylinder. When the valve member is moved away from its seat fluid enters the space between the valve stem and the sleeve and holds the sleeve in a slightly eccentric position with respect to the axis of the stem, this being a position in which the outer surface of the sleeve is in contact with the inner surface of the cylinder. The sleeve thus closes the port in the cylinder until the valve stem has been moved axially a distance sufficient for the lower edge of the sleeve to uncover the port. In this way the sleeve effects the throttling action of the valve.

It will be readily apparent that in order to permit the sleeve-like member to be moved transversely of the axis to the stem between the stem and cylinder, the outer diameter of the sleeve must be significantly less than the inside diameter of the cylinder. This means that adjacent surfaces of the sleeve and cylinder are not completely congruent when the sleeve is in contact with the cylinder in its port-closing position.

I have now devised a modification of the aforementioned throttling valve in which the portion of the sleeve-like member overlying the surface of the cylinder adjacent its port is in completely congruent contact with the cylinder. Pursuant to the present invention the sleeve-like member is composed essentially of a sector portion and a separate guide portion, the sector portion being positioned adjacent the port of the cylinder. The thickness of the sector portion of the sleeve-like member is substantially less than the space between the valve stem and cylinder, and the outer surface of the sector portion has a radius of curvature identical with that of the inner surface of the cylinder.

These and other novel features of the throttling valve of the invention will be more readily understood from the following description taken in conjunction with the drawings in which—

Figure 1:
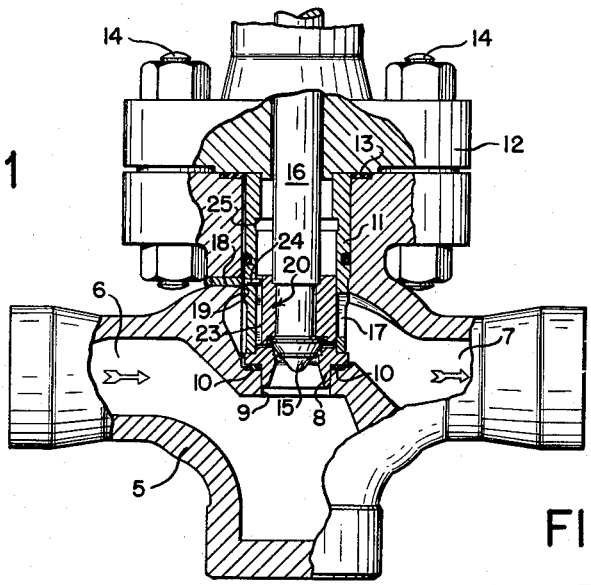
FIG. 1 is a side elevation of the throttling valve with the central portion broken away.

As shown in FIG. 1, the valve body 5 is provided with an inlet side 6 and an outlet side 7. A replaceable valve seat 8 is arranged in a passage 9 between the inlet and outlet sides of the valve. A gasket 10 is arranged between the valve seat member 8 and the valve body in order to prevent leakage. A cylinder 11 fits into the central bore in the upper portion of the valve body. A bonnet flange 12 is arranged on the valve body with a gasket 13 between the bonnet flange and the valve body to seal the joint, and bolts 14 secure the bonnet flange to the valve body. The cylinder 11 is of such length that when the bonnet bolts are tightened to compress the gasket 13 and form a tight fit, the cylinder engages the valve seat 8 and also causes the gasket 10 to be compressed, thus forming tight seals between the valve body and the bonnet flange and between valve seat and the valve body.

A valve plug 15 is mounted in the central bore of the valve body and cooperates with the valve seat. The plug is connected to a valve stem 16 which extends from the valve body and is operatively connected to a conventional valve operating means. Such operating means may be manual, pneumatic, electric, hydraulic, or mechanical.

A port 17 in the wall of the cylinder 11 permits the discharge of fluid into the outlet side 7 of the valve and is held in the direction of the outlet side by a dowel pin 18 which fits into a slot 19 in the cylinder. The port 17 may be made of a shape or contour required to give any desired throttling characteristic such, for example, as that known as "Quick Acting," "Linear" or "Equal Percentage."

Figure 2:
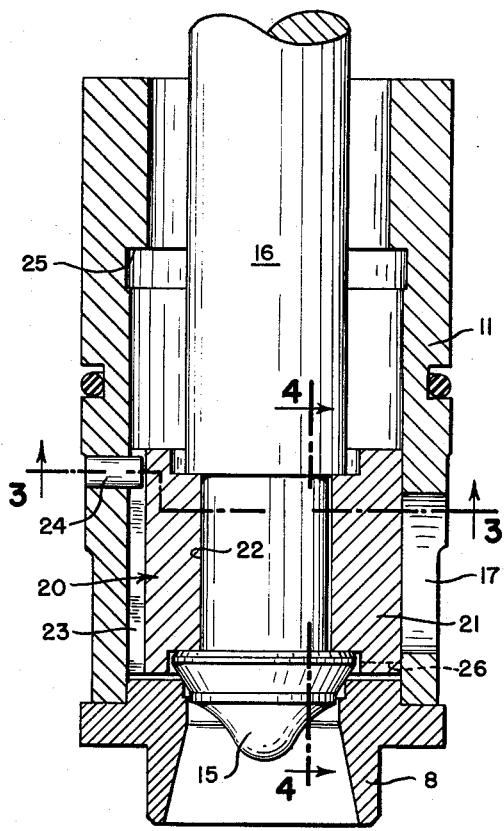
FIG. 2 is a detailed side sectional elevation of the portion of the valve shown broken away in FIG. 1.
Figure 3:
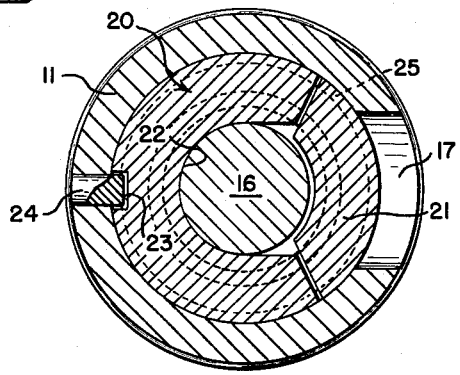
FIG. 3 is a section taken along line 3—3 in FIG. 2.

Control of the flow of fluid through the port 17 in the cylinder 11 is effected by the sleeve-like member of this invention. The sleeve-like member comprises a guide portion 20 and a sector portion 21. As can be clearly seen in FIGS. 2 and 3 the two portions surround the valve stem 16 in the nature of a sleeve and are held or locked in axial position with respect to the stem by fitting at least partially within a recess 22 cut in the stem. The guide portion 20 is substantially U-shaped and fits smoothly between the recessed portion of the stem and the inside surface of the cylinder. The sector portion 21 has a thickness somewhat less than the space between the recessed portion of the valve stem and the inner surface of the cylinder so that it is free to move slightly in a direction transverse to the axis of the stem. The outer surface of the sector portion 21 has the same radius of curvature as the inner surface of the cylinder 11 so that these two surfaces make congruent contact when fluid admitted through the valve seat 8 acts upon the inner surface of the sector portion 21 to force it outwardly into contact with the cylinder.

The outer face of the guide portion 20 of the sleeve-like member is provided with a longitudinal keyway 23 which engages a key 24 mounted in the cylinder 11 so that the guide portion will not rotate as it moves axially of the valve body along with the valve stem. An inwardly projecting shoulder 25 in the upper inner surface of the cylinder 11 limits axial movement of the guide portion 20 so that the key 24 will not leave the keyway 23. The legs of the guide portion 20 terminate just short of the side edges of the sector portion 21 so as to permit the aforementioned movement of the sector portion while at the same time preventing a significant degree of rotation of the sector portion around the valve stem. The sector portion 21 is thus maintained in operative position with respect to the cylinder port 17 but is free to move axially of the valve body along with the valve stem 16.

The position of the sector portion 21 with respect to the cylinder port 17 determines the throttling effect of the valve, the throttling taking place at the bottom edge of the sector portion 21 and not at the valve seat 8. Any erosion or wear of the sector portion can be simply remedied by replacing only the sector portion of the valve.

Figure 4:
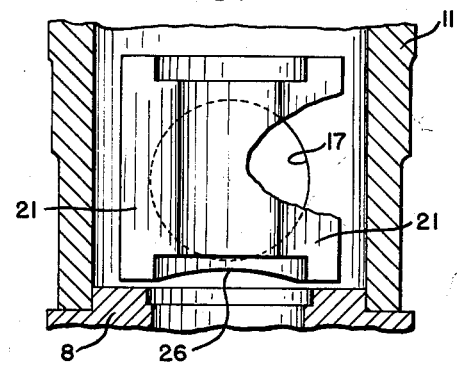
FIG. 4 is a partial side elevation taken along line 4—4 in FIG. 2 with the valve stem removed.

Further flexibility in control over the throttling action of the valve of the present invention is afforded by variation in the contour of the bottom edge of the sector portion 21 and the shape of the cylinder port 17, as shown in FIG. 4. Thus, a specific and well-known characteristic of flow control is provided when the cylinder port 17 is circular and the lower (throttling) edge 26 of the sector portion of the sleeve-like member is upwardly arched as shown in this figure. It will be readily understood by those skilled in the art that by changing the shape of the cylinder port 17 to that of a square, oblong, trapezoid, oval, triangle, or the like, or by changing the shape of the throttling edge 26 of the sector portion to that of a straight, rounded, rectangular, triangular, paraboloid, or other similar edge contour, or by a combination of these variants, any desired control of the fluid flow may be readily obtained.

I claim:

In a throttling valve comprising a valve body having an inlet side and an outlet side, a valve seat between the inlet and outlet sides, a valve member cooperating with the valve seat, a valve stem operatively associated with the valve member, a sleeve-like member surrounding the valve stem and axially locked to the stem so as to be movable axially therewith, and a cylinder in the valve body closely surrounding the sleeve-like member and having a port on only one side thereof facing the outlet side of the valve body, the improvement which comprises a sleeve-like member composed essentially of a sector portion and a separate guide portion, the sector portion being positioned adjacent the port of the cylinder, the thickness of the sector portion being substantially less than the space between the valve stem and cylinder within which the sector portion is positioned, the outer surface of the sector portion having a radius of curvature identical with that of the inner surface of the cylinder, and in which the guide portion of the sleeve-like member is substantially U-shaped in transverse cross-section.

References Cited in the file of this patent

UNITED STATES PATENTS

| | | |
|---|---|---|
| 731,942 | Parson | June 23, 1903 |
| 1,339,665 | Otto | May 11, 1920 |
| 2,988,105 | Soderberg | June 13, 1961 |
| 2,994,343 | Banks | Aug. 1, 1961 |